Figure 1:
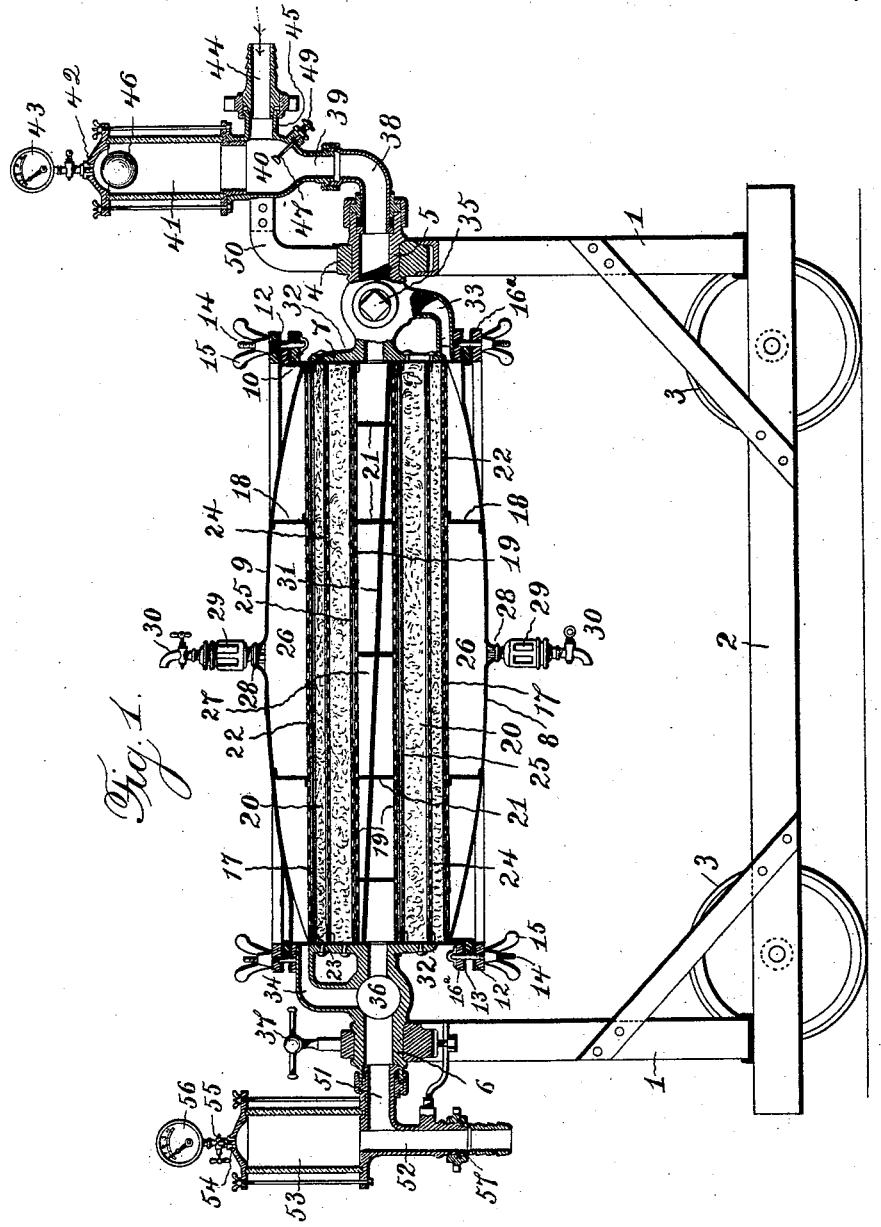

(No Model.) 5 Sheets—Sheet 1.

W. ALBACH.
APPARATUS FOR FILTERING BEER.

No. 536,503. Patented Mar. 26, 1895.

Witnesses:
Jas. E. Hutchinson.
Thos. A. Green

Inventor.
Wilhelm Albach,
By James L. Norris.
Attorney.

THE NORRIS PETERS CO., PHOTO-LITHO., WASHINGTON, D. C.

(No Model.) 5 Sheets—Sheet 3.

W. ALBACH.
APPARATUS FOR FILTERING BEER.

No. 536,503. Patented Mar. 26, 1895.

Witnesses:
Jas E. Hutchinson.
Thos. A. Greene

Inventor
Wilhelm Albach,
By James L. Norris.
Attorney.

(No Model.) 5 Sheets—Sheet 4.
W. ALBACH.
APPARATUS FOR FILTERING BEER.

No. 536,503. Patented Mar. 26, 1895.

(No Model.) 5 Sheets—Sheet 5.

W. ALBACH.
APPARATUS FOR FILTERING BEER.

No. 536,503. Patented Mar. 26, 1895.

UNITED STATES PATENT OFFICE.

WILHELM ALBACH, OF HÖCHST-ON-THE-MAIN, GERMANY.

APPARATUS FOR FILTERING BEER.

SPECIFICATION forming part of Letters Patent No. 536,503, dated March 26, 1895.

Application filed July 12, 1894. Serial No. 517,305. (No model.)

*To all whom it may concern:*

Be it known that I, WILHELM ALBACH, a subject of the Emperor of Germany, residing at Höchst-on-the-Main, Empire of Germany, have invented new and useful Improvements in Apparatus for Filtering Beer and other Aerated Liquids, of which the following is a specification.

My invention relates to apparatus for filtering beer and other aerated liquids, the general purpose of which is as follows: In transferring beer from the large casks, or barrels, in which it is contained, to smaller casks in which it is sold to the retailers, it is frequently necessary to filter it, and many different forms of filtration-apparatus have been devised for this purpose. Heretofore, however, difficulties have been experienced in each instance which it is the purpose of my invention to avoid. For example, either the beer has been mingled with water, or an escape of the carbonic acid gas has been unavoidable, by either of which causes the quality of the beer has been greatly deteriorated. The escaping carbonic acid gas, in combination with air, which it has been found impossible to wholly remove by the methods heretofore in use, produce a thick, heavy foam, which renders the operation of filtering very difficult, as it seriously clogs the filtration apparatus and obstructs its action, while the removal of this foam, which cannot be introduced into the casks, involves the loss of a considerable quantity of carbonic acid which is not only necessary for the preservation of the beer, but is an important ingredient in rendering the same palatable. It has been found, also, that in some methods of filtration a variation in the pressure by which the beer is forced through the filtering material, causes the latter to lose its normal consistency, and the beer, from this cause, comes forth in a muddy, or turbid condition, which greatly impairs, and often destroys its market value.

To avoid one of the difficulties mentioned, it has been proposed to fill the entire filtration-apparatus with water, in order to expel the air, after which the water was forced out by the passage of the beer through the filter. The unavoidable consequence of this mode of procedure is that the beer is more or less adulterated by water, which impairs its quality and reduces its strength. It has been found in practical use, moreover, that when the beer enters the filtration-apparatus from below, or from below and from both sides, and passes the filtering-material upward, or from the outer toward the inner part, the carbonic acid gas rises and occupies the space which is required for the liquid, and for this reason only about half the space of the filter can be utilized. This fact is clearly shown when the filtering material is removed, its lower portion being of a brown color and filled with a yeasty substance, while the upper part is still white, the presence of the carbonic acid gas having prevented the beer from penetrating this portion. It has also been proposed to admit the beer to the filtration-apparatus at the side and cause part to flow upward and the other part downward, each portion passing through beds or layers, of filtering-material separated by a chamber, on inclosed space, in which the liquid which has passed the first layer accumulates, before it begins to penetrate the second layer. The beer entering the filter at the side flows into two separate chambers, or compartments, at or near the middle of the apparatus, and is forced from the same upward and downward, respectively. The carbonic acid gas, however, rises from the beer flowing upward, and enters the space, or compartment, between the layers of filtering material, being forced therein by the pressure of the beer until further compression is impossible. As it does not re-unite with the beer, it offers an effectual barrier to its passage through the second layer, and as it combines with the air present it produces a thick, heavy foam which, of itself alone, is a serious obstacle to the passage of the beer. Finally, if the cock be closed in the pipe which supplies beer to the filter, the filtering material, which is under an excess of pressure, while the cock is open, is radically changed in consistency by its close, and the yeast particles, which are prevented from passing the filtering material by this excess of pressure, are enabled to enter said material when it is softened by the removal of pressure. Then when the cock in the inlet-pipe is again opened, these particles are carried away by the entering beer, which becomes turbid and muddy in appearance because of their presence. These being some of the principal difficulties in the filtration of beer and aerated liquids, it is my purpose to provide apparatus for filtering said liquids in such manner as to avoid the objections and difficulties noted, and to enable others to understand and practice said invention I will proceed to describe the same in detail, reference being had, for such purpose, to the accompanying drawings showing an apparatus suitable for the practice of my invention.

Figure 2:
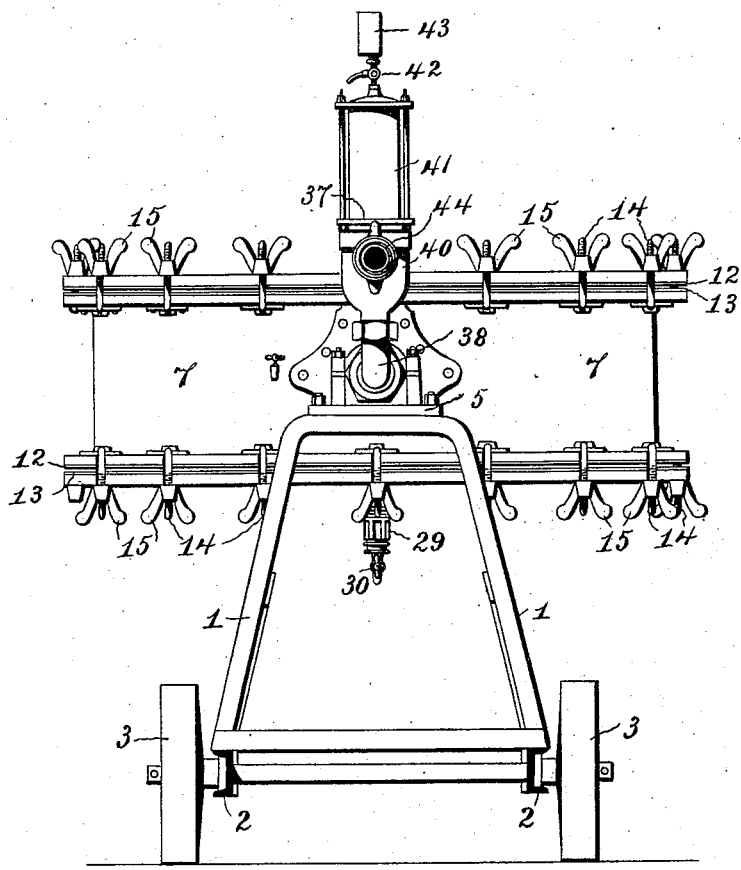
Figure 3:
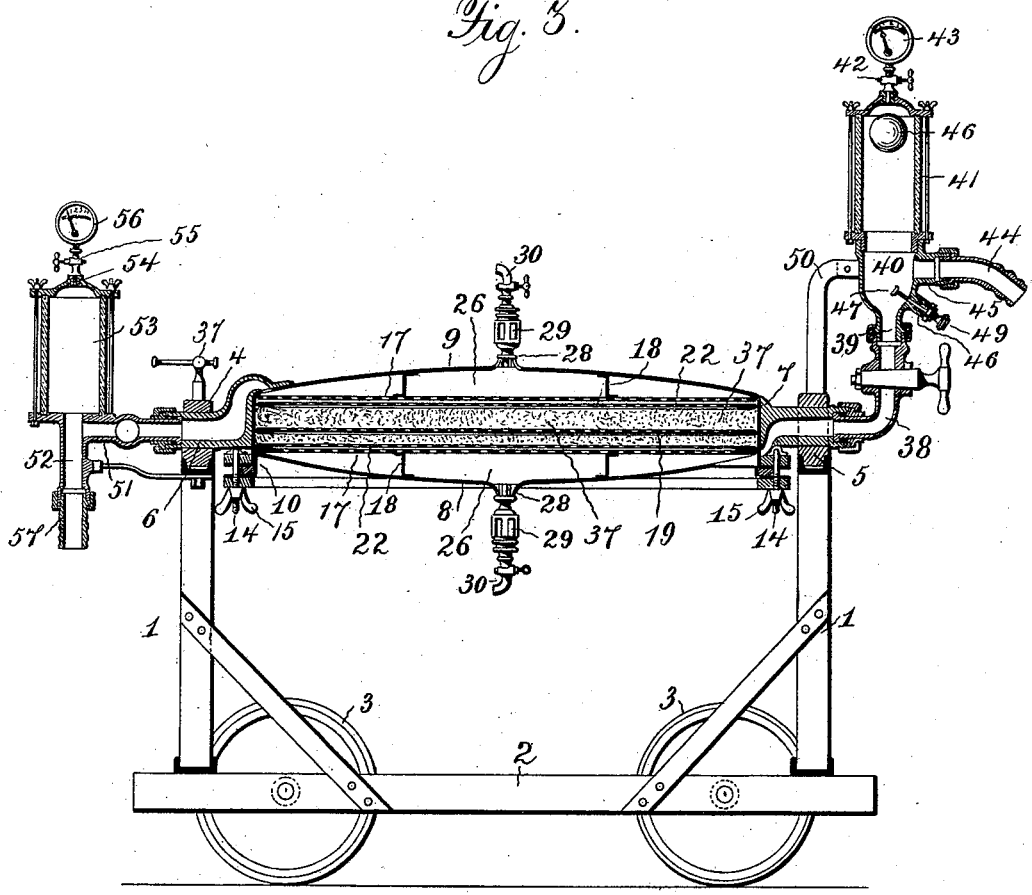
Figure 4:
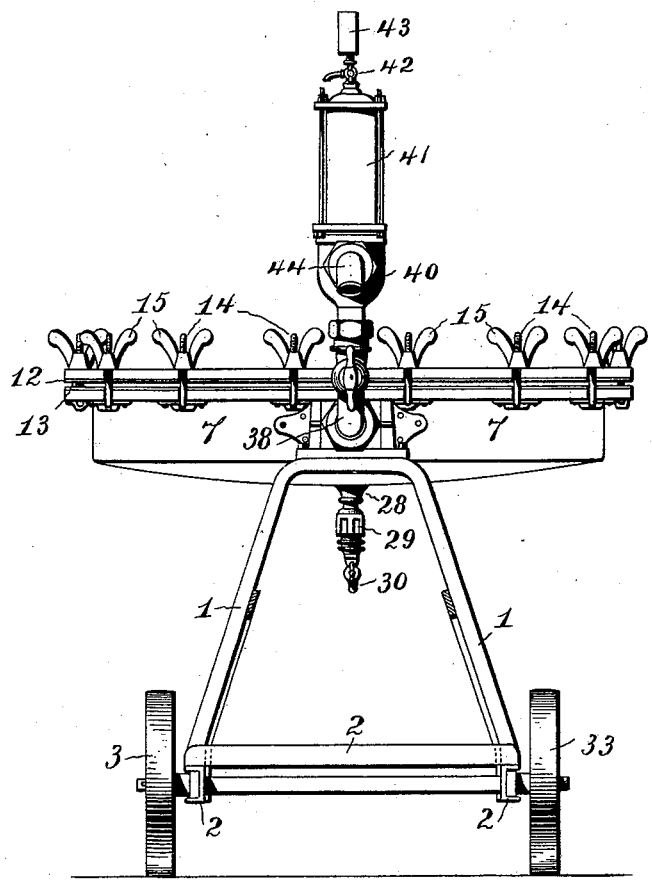
Figure 5:
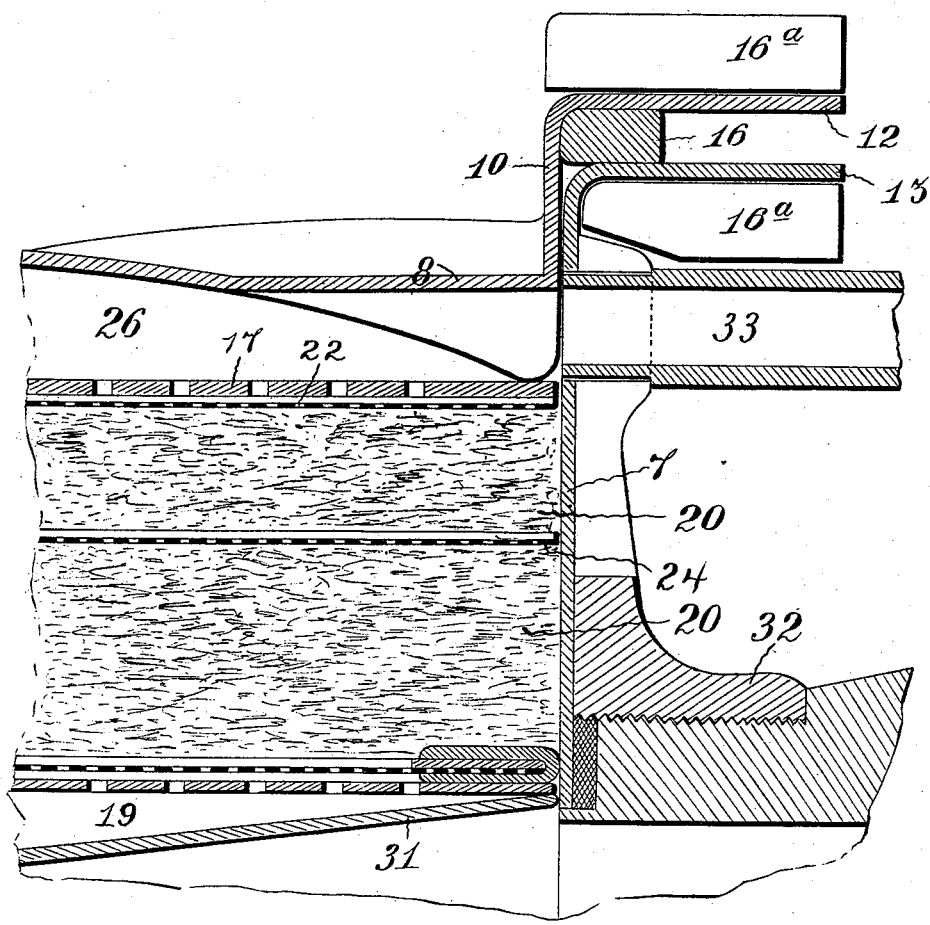

In the said drawings—Figure 1 is a vertical section taken centrally, from end to end of an apparatus organized in accordance with my invention. Fig. 2 is an end elevation taken from the right hand of Fig. 1. Fig. 3 is a vertical section taken from end to end of a mechanism slightly modified from that shown in Fig. 1. Fig. 4 is an end elevation taken from the right hand of Fig. 3. Fig. 5 is a detail section, upon a somewhat larger scale, showing the construction of parts and the arrangement and means of retaining and compressing the filtering material.

The reference-numeral 1, in said drawings, indicates a carriage-frame, preferably of wrought iron, its lower sills 2 being mounted upon wheels 3, to facilitate its removal from place to place. Near the ends of these sills rise the two end parts of the frame 1, strengthened by diagonal braces. Upon these end portions of the frame are supported boxes 4, in which hollow journals 5 and 6 have bearing. Between these journals and supported by them is a drum, inclosed by a substantially circular wall 7, of a suitable metal, and two covers 8 and 9, which are outwardly convex. Each of these covers is provided with a circumferential, upwardly turned flange 10, which lies just within the circular wall 7, and each flange has an outwardly turned edge, or collar, 12, which projects over the edge of the wall 7 and lies in substantial parallelism with a flange, or collar 13, on the said wall 7. The covers are connected to the circular wall by bolts 14, passed through openings in the flanges and collars 12 and 13, and thumb-nuts 15 are turned upon their threaded ends. In order to pack the joint and render it practically air-tight, a ring, or gasket 16, of rubber or other suitable material, is interposed between said collars and compressed by turning up the thumb-nuts. Metallic rings 16ª of suitable weight, are placed above and below the respective collars to serve as clamps, or compressors, and afford a suitable bearing for the bolts and nuts.

Within the drum are arranged perforated, or foraminous plates 17, formed of any suitable material, on the edges of which the edges of the convex covers rest. Between said plates 17 and the concave interior faces of the covers are interposed angle-irons 18 which support the plates 17 against strain. Upon each side of the central, horizontal plane of the drum, and at a short remove therefrom are arranged foraminous plates 19, between which and the plates 17 are interposed the bodies of filtering material 20. The composition of this material forms no part of my present invention, and need not therefore, be described further, except to state that it may be of any known, or preferred kind. The perforated, or foraminous plates 17 and 19 are usually made of copper of sufficient strength to resist any strain that will be imposed thereon. They are reinforced by the angle-irons 18, and by supports 21, interposed between the plates 19. Adjacent to the plates 17 lie fine sieves 22 their edges provided with rubber bindings 23, which have contact with the interior face of the circular wall 7. Two-thirds, or thereabout, of the mass of filtering material lie between the sieves 22, and sieves 24, of somewhat coarser texture, the other third being inclosed between said sieves 24 and sieve 25, which lie against, or in close proximity to, the copper plates 19. Between the covers 8 and 9 and the two copper plates 17 are inclosed chambers 26, of substantially similar form, and between the two copper plates 19 lies a central chamber 27. Between the latter and the two chambers 26 lie the two bodies of filtering material, already described. The covers 8 and 9 are each provided with an outlet 28, having an inspection-glass 29, and cock 30. The central chamber 27 is divided into two equal parts by a diagonal partition 31, which extends from the top of the chamber, on one side, to the bottom thereof, upon the sides diametrically opposite.

The hollow journals 5 and 6 have flanges 32 which are bolted to the circular wall 7, at opposite points. Each hollow journal has communication with the central-chamber 27, the journal 5 opening upon one side of the dividing partition, and the journal 6 upon the other side. Springing from the journal 5 is a branch pipe 33, which enters one of the chambers 26, and a similar branch 34 places the other journal 6 in like communication with the other chamber 26. At the points where said branch-pipes open out of the respective hollow journals, are arranged three-way cocks 35 and 36, respectively. The axis of the journals 5 and 6 is horizontal, and they are intended to revolve in their bearings, for a purpose presently to be explained. In order to arrest, or prevent, such revolution, brake-screws 37 may be provided, whereby the bearing of one, or both, the journals may be so clamped thereon as to prevent revolution.

Coupled to the hollow journal 5 in any suitable manner, is an elbow-tube 38, which turns upward and is connected to a neck 39, which opens into a chamber 40, a little above the point of connection. This chamber is surmounted by a cylindrical air-trap 41, usually formed of glass, and provided at its upper end with an outlet 42, communicating with a pressure-gage 43. Entering the chamber 40, between the air trap and the bottom of said chamber, is a passage 44, formed by a short tube which is coupled to a neck 45, projecting horizontally from the side of the chamber. Within the latter is a ball-valve 46, consisting of a hollow sphere of rubber, or other suitable material, having a specific gravity which enables it to float upon the liquid passing through the filtration-apparatus. This valve seats in the bottom of the chamber 40, and closes the entrance to the elbow-tube 38. This ball-valve, which is seated by the fall of the liquid in the chamber 41 is kept seated by the pressure of the liquid in the pipe 44. It may be unseated by a displacing-stem 47, lying in a hollow nipple 48, and operated by means of a knob 49. When said ball-valve is displaced from its seat its buoyancy will enable it to rise, if the chamber 40 is filled with fluid, and even ascend to the upper part of the air-trap 41, or as high as the fluid level may rise. The air-trap is maintained in a vertical position by means of a bracket 50, rising from the end-frame 1.

Coupled to the hollow journal 6 is a short, tubular section 51, communicating with an upwardly and downwardly extending branch 52. Upon the former is mounted a cylindrical glass vessel, or receiver 53, having an outlet 54 at its top, capable of being opened and closed by a cock 55, and communicating with a pressure-gage 56. The downwardly projecting portion of the branch 52 is provided with a terminal 57, which is adapted to connect with the end of a flexible tube, not shown in the drawings. The horizontally projecting tube connected to the neck 45, on the opposite side of the drum, has a similar provision, for a like purpose.

The beer to be filtered enters through the passage 44, chamber 40, and hollow journal 5, passing from the latter through the three-way cock 35, part going to that portion of the central chamber 27 which lies upon one side of the diagonal partition 31, and the other part flowing through the branch pipe 33 into one of the chambers 26. In the one case, the pressure forces the beer through the single layer of filtering material, by which the greater part of the foreign matter, or impurities, is eliminated, and then through the remaining two-thirds part of said layer, which completes the filtration by retaining the more finely divided matter. In the other case the beer is forced through the two-thirds part and then through the one-third part of the other filtering layer.

The process of filtration is carried on substantially as follows: The double filtration apparatus, above described, is so organized that there are two filtering layers in one drum, separated from each other by the diagonal partition 31. In the position shown in Fig. 1 of the drawings, the liquid to be filtered passes through the filtering-layer from beneath to above, but when the drum is turned through one half of a revolution, the liquid will pass in the opposite direction, or from above the filtering-layers downward. All water contained in the drum is led off, and the drum is so placed that the water contained first fills the upper chamber 26, expelling the air by means of the outlet 28, and cock 30, the lower chamber after it is inverted by a half revolution of the drum being freed from air by filling the same with water and letting the air escape through faucet 30. The beer is then admitted to the upper chamber 26, expelling any air that remains by way of the outlet 28, the water and air that may remain in the filtering material moving in advance of the beer until the latter is seen to be pure. The drum is then turned one-half a revolution, whereby the beer is caused to rise and press upward through the filtering-material until the remaining air is expelled from the other chamber 26, through the outlet 28. As soon as the beer is seen to be pure in the inspection-glass 29, the cock 30 is closed and the drum is again revolved through half of a revolution and clamped by means of the brake-screws. The filtration then proceeds from above the filtering-layers downward. As the first flow of beer enters the passage 44, the displacing stem 47 is drawn out, to permit the ball-valve 46 to seat and close the entrance to the hollow journal 5. The beer then fills the air-trap 41, the outlet 42 being open, and after all the air has been expelled, the displacing stem 47 is pushed in, the ball-valve is unseated and swims upward into the inspection-glass of the air-trap, and the beer flows through the hollow journal 5 into the drum.

When the barrel from which the beer is taken is emptied, the air-trap prevents the entrance of air to the drum, since the ball-valve 46 descends, with the last of the beer, into the chamber 40, and, the displacing-stem 47 being drawn out, after unseating the ball, it drops into its seat and closes the entrance to the hollow journal 5 before any air has an opportunity to enter. When a new barrel is broached, the air contained in the pipe leading to the air-trap is led off in the manner described, and as soon as clear beer is seen in the inspection glass the ball-valve is again unseated by means of the displacing-stem 47, and the filtration proceeds, in the manner already described.

When the process is to be arrested, the displacing-stem is pushed inward to prevent the ball-valve from seating, and the air, pressing upon the filtered beer, drives it out of the filtration-drum, thereby preventing loss by obtaining all the beer that enters the drum in the casks receiving the filtered beer.

While I may use any suitable filtering-material, I prefer to employ a chemically pure substance, consisting of the fibers of linen, wool, cotton, celluloid, and asbestos, which can be used for long periods and may be cleansed by steam, whereas the flannel filters, which have been used heretofore, especially where very fine impurities were to be eliminated, cannot be cleansed by heat and moisture, by reason of the shrinkage thereby produced.

The fine sieves lying close to the copper plates 17 and 19 are provided with rubber binding, or packings, upon their edges, as already stated, which make close joints and all the parts which come in contact with the beer, or other liquid, are covered with English tin and are soldered in accordance with the most modern sanitary principles.

The grossest impurities are removed by the filtering layer of least thickness, in one half the drum, and by the thicker layer in the other half, the process of filtering being first through the thin layer, on one side and then through the thicker, while on the other side it is first through the thicker and then through the thin layer.

The modified form of the apparatus, shown in Figs. 3 and 4, differs from that described above in having a single layer 37 of filtering material, arranged substantially in the central part of the drum, the latter being provided with but one removable cover. The branch pipes 33 and 34 are omitted and the inlet journal 5 is so formed as to communicate with one of the chambers 26, on one side of the filtering layer, while the outlet 6 communicates with the other chamber, on the opposite side of the filtering layer. In other respects the two organizations do not differ materially, and their operation is, in all essential respects, similar.

The cost of filtration is small, and if ordinary care is taken the filtering material can be used for a long period without being renewed.

The apparatus can be used for filtering wine, cider, whisky, gelatine, water, and all kinds of liquors, or fluids, can be filtered by the apparatus described.

Yarn-cotton, or nitro-cellulose, which heretofore could only be washed in distilled water, has been successfully washed with water-filtered by my invention and the results obtained were fully equal to those secured by using water condensed from steam.

To filter cider, or wine made from berries, all that is needed is to place more or less filtering material in the apparatus. The mechanical clarification of wine is greatly to be preferred to any chemical process for a like purpose, since the former does not impair the aroma, or "bouquet" of the wine, but simply removes foreign impurities, leaving the liquor unchanged.

What I claim is—

1. The apparatus herein shown and described, the same consisting of a revoluble drum containing a central chamber lying in the axial plane and divided by a diagonal partition terminating on opposite sides of the inlet and outlet, respectively, each of the two parts of the drum lying on opposite sides of the central chamber being provided with one or more layers of filtering material, a hollow journal forming an inlet for the beer which communicates with the drum upon one side of the central chamber, a second hollow journal forming an outlet for the filtered beer which communicates with the drum upon the other side of said chamber, a branch pipe from the inlet and outlet, respectively, communicating with spaces between the filtering material and the top and bottom of the drum, an air-trap arranged above the pipe leading to the hollow inlet, a buoyant ball-valve adapted to close the passage to said journal, and means for displacing said ball-valve from its seat, substantially as described.

2. An apparatus for filtering beer and other aerated liquids, consisting of a revoluble drum containing two chambers provided, each with one or more layers of filtering material, opposite hollow journals which form an inlet and outlet and communicate with a central chamber lying in the axial line of the drum and separated by a diagonal partition into two parts, one communicating with the inlet and the other with the outlet, branch pipes connecting the inlet and outlet with chambers between the filtering material and the top and bottom of the drum, each branch having a three-way cock, and an air-trap communicating with the inlet and with the branch pipe therefrom, substantially as described.

3. An apparatus for filtering beer and other aerated liquids, consisting of a revoluble drum containing two layers of filtering-material separated by a central chamber, each layer being divided by a sieve plate into two parts, one comprising about one-third and the other about two-thirds of the thickness, a partition dividing said central chamber diagonally, hollow journals forming an inlet and outlet and communicating with said chamber upon opposite sides of the partition, respectively, said journals being provided with branch pipes which connect the inlet and outlet with chambers between the layers of filtering material and the top and bottom of the drum, and three-way cocks arranged at the points where said branch-pipes unite with the hollow-journals, substantially as described.

4. An apparatus for filtering beer comprising a revoluble drum containing two layers of filtering material, each layer divided into two parts by a sieve-plate and inclosed by sieve-plates of different fineness, one of said parts comprising about one-third and the other about two-thirds of the thickness of each layer, a central chamber separating the two layers, a partition dividing said chamber diagonally, hollow inlet and outlet journals communicating with said chamber on opposite sides of the partition, respectively, said journals having branch pipes one communicating with the central chamber on opposite sides of the partition, and cocks arranged at the points where said branch pipes enter the hollow journals, substantially as described.

5. A filtering apparatus for filtering beer and other aerated liquids, consisting of a drum containing one or more layers of filtering material, hollow journals forming an inlet and outlet to said drum, and communicating with chambers between the filtering material and the top and bottom of the drum, respectively, said top and bottom being provided with outlets having inspection-glasses and cocks, an air-trap arranged above the pipe leading to the inlet journal and provided at its top with a three-way cock and pressure-gage, a buoyant ball-valve adapted to close the passage to said journal below the trap, and a displacing stem to unseat said valve, substantially as described.

In testimony whereof I have hereunto set my hand and affixed my seal in presence of two subscribing witnesses.

WILHELM ALBACH. [L. S.]

Witnesses:
FRANK H. MASON,
THEODOR WILHELM.